(12) United States Patent
Liu et al.

(10) Patent No.: US 8,946,328 B2
(45) Date of Patent: Feb. 3, 2015

(54) RESIN COMPOSITION USED FOR PEELABLE COATING AND COMPOUNDING PROCESS THEREOF

(75) Inventors: Quanhui Liu, Guangdong (CN); Stefan Siffrin, Guangdong (CN); Quanyao Liu, Guangdong (CN)

(73) Assignee: Shenzhen Yong Feng Yuan Industry Co., Ltd., Shenzhen, Guangdong (CN)

( * ) Notice: Subject to any disclaimer, the term of this patent is extended or adjusted under 35 U.S.C. 154(b) by 208 days.

(21) Appl. No.: 13/497,448

(22) PCT Filed: Dec. 28, 2009

(86) PCT No.: PCT/CN2009/076143
§ 371 (c)(1),
(2), (4) Date: Mar. 21, 2012

(87) PCT Pub. No.: WO2011/035522
PCT Pub. Date: Mar. 31, 2011

(65) Prior Publication Data
US 2012/0178862 A1    Jul. 12, 2012

(30) Foreign Application Priority Data
Sep. 22, 2009 (CN) .......................... 2009 1 0190377

(51) Int. Cl.
*C08F 220/14* (2006.01)
*C08L 33/08* (2006.01)
*C08L 71/02* (2006.01)
*C09D 5/20* (2006.01)
*C09D 133/08* (2006.01)
*C09D 7/12* (2006.01)
*C08F 220/18* (2006.01)

(52) U.S. Cl.
CPC ............ *C09D 7/1233* (2013.01); *C08F 220/14* (2013.01); *C08L 33/08* (2013.01); *C09D 5/20* (2013.01); *C09D 133/08* (2013.01); *C08F 2220/1825* (2013.01); *C08L 71/02* (2013.01)
USPC ........... 524/312; 524/296; 524/388; 524/317; 106/170.35

(58) Field of Classification Search
USPC .......... 525/222; 524/560, 296, 388, 317, 312; 106/170.35
See application file for complete search history.

(56) References Cited

U.S. PATENT DOCUMENTS 6,620,890 B1 *   9/2003   Yamashita et al. ............ 525/222

* cited by examiner

*Primary Examiner* — James J Seidleck
*Assistant Examiner* — Deve E Valdez
(74) *Attorney, Agent, or Firm* — Jackson IPG PLLC

(57) ABSTRACT

The present invention provides a resin composition used for peelable coating and compounding process thereof. The composition includes the following components: (a) 100 parts by weight of film-forming resin containing at least one acrylic resin; (b) 0.1-40 parts by weight of at least one separating agent, which is polypropylene glycol or glycerin fatty acid ester or their mixtures; and (c) 40-60 parts by weight of at least one solvent. The peelable coating formed from the resin composition has excellent water resistance and excellent peeling performance even under the condition of prolonging storage period.

7 Claims, No Drawings

RESIN COMPOSITION USED FOR PEELABLE COATING AND COMPOUNDING PROCESS THEREOF

TECHNICAL FIELD OF THE INVENTION

The present invention belongs to the technical field of composite coatings, and in particular relates to a resin composition used for peelable coating and compounding process thereof.

BACKGROUND OF THE INVENTION

The decoration method of silicate substrate products such as commercial ceramics and glass products or the like is usually to form patterns on the surfaces of silicate substrates such as glass products by the screen printing method, offset printing method or other direct printing technologies. Therefore, it has always been expected to apply the curing organic pigment ink to the decoration of silicate substrates such as glass and ceramics or the like. After the curing organic pigment ink is printed on the paper carriers, a layer of so-called peelable cover glue (also referred to as a peelable coating) is printed thereon. The cover glue is peelable after the carriers are coated on the ceramics or glass substrates. But the curing organic pigment ink can be cured in a baking manner at a temperature of between 160 degrees Celsius and 200 degrees Celsius.

The peelable coating cannot meet the following requirements for a long period of time: (1) during the whole process from printing to peeling, the coating film is always bonded together with the color layer below it completely; (2) the coating film should keep stable easily-peeling performance; (3) when applied to the glass or ceramics, the coating film should have enough mechanical strength; (4) the component of the coated layer should have the characteristics of fast drying.

Although an improved peelable coating is recorded in some patents, for example: the application of component containing wax, vinyl copolymer and low-molecular weight acrylic acid to peelable coating is disclosed in U.S. Pat. No. 3,368,989; the component of peelable coating disclosed in U.S. Pat. No. 3,489,705 includes petroleum wax, copolymer, and organic amine releasing agent; there is also provided a copolymer, ethylene-vinyl acetate copolymer, or ethylene-ethyl acrylate copolymer or ethylene isobutyl acrylate suitable for use. In this patent, the releasing agent is an essential component, but schemes recorded in these patents still cannot overcome the above defects.

SUMMARY OF THE INVENTION

One of the goals of the present invention is to provide a resin composition used for peelable coating, in which the organic pigment layer printed on the carrier includes a specific film-forming polymer resin and a separating agent, the film formed is very tough, after the paper is coated on the substrate, it shows excellent peeling performance, which solves the defects of the prior art.

In order to achieve the goal above, the present invention adopts the technical scheme as follows:

A resin composition used for peelable coating includes the following components in part by weight:
(a) film-forming resin containing at least one acrylic resin, defined to be 100 parts;
(b) at least one separating agent, which is polypropylene glycol or glycerin fatty acid ester or their mixtures, defined to be 0.1-40 parts based on component (a); and
(c) at least one solvent, defined to be 40-60 parts based on component (a).

A preferred scheme is that the resin composition further includes the following component in part by weight:
(d) at least one additive, defined to be 0.1-2 parts based on component (a).

A further preferred scheme is that:
the solvent of the component (c) is one or more mixtures of propanol, butanol, diacetone alcohol, aromatic hydrocarbon, and glycol ether;
the additive of the component (d) is one or more mixtures of plasticizer, pigment, defoamer, and thixotropic agent.

A further preferred scheme is that:
the aromatic hydrocarbon of the component (c) is trimethylbenzene and derivative thereof;
the plasticizer of the component (d) is phthalate ester.

A further preferred scheme is that:
the acrylic resin of the component (a) is butyl methacrylate-methyl methacrylate copolymer with the average molecular weight of 150.00~0180.000.

A further preferred scheme is that:
the component (b) is polypropylene glycol with the molecular weight of 8000~20.000, and glycerin fatty acid ester with the acidity of 0-1 mg KOH/g and the saponification value of 151-170 mg KOH/g.

A further preferred scheme is that:
the component (b) is defined to be 1-30 parts based on component (a).

Another goal of the present invention is to provide a process for compounding resin composition used for peelable coating, including the following steps:
(A) weighing the components (a), (b), (c) and (d) of the resin composition used for peelable coating described in the previous goal of the invention, uniformly mixing the components at room temperature;
(B) heating the mixture for 30-60 min at a temperature of 50-70 degrees Celsius, preferably heating for 45 min at a temperature of 60 degrees Celsius.

From one aspect of the present invention, the transfer printing system includes a transfer substrate present in a form of paper with water-soluble coating and a decorative material. The decorative material may be solvent-based pigmented media, and also may be organic dye or pigment or other granular materials. The decorative material may be applied to the paper carrier by the screen printing method. The peelable protective coating may brings great convenience for transfer substrate, also may be used for the method for transferring generated images.

The component (a), the film-forming resin, used for the resin component of the coating of the present invention, is selected from thermoplastic resin group, such as acrylic resin; the separating agent, which may be compatible with the film-forming resin well, is an essential part coated to the coating of designed pattern area, selected from polypropylene glycol or glycerin fatty acid ester or their mixtures. The content of the component (b) is between 0.1 and 40 (part by weight); or based on 100 parts of the component (a), the component (b) is preferably 1~30 parts. Due to the small weight ratio, the resultant coating film has insufficient peeling performance. However, big content ratio will not have special effects on the film, but also cause economic losses.

In narrow sense, the content of the solvent of the component (c) is not critical. On the basis of the whole formula, its usual standard may be 55 parts or more. Therefore, the resultant coating component can have enough viscosity.

In order to further enhance or improve the flexibility, tonality or other performance of the formed coating film, the peelable coating of the present invention may contain many known additives (d), for example plasticizer, such as titanate, pigment or the like as required. Additionally, the additive (d) used in the oily coating system may be organic silicon defoamer for preventing foam and bubble from being formed during the formation of coating by the screen printing method.

The transfer printing method includes the following steps: peeling paper and transfer substrate by an immersion method; placing the transfer substrate on the surface of silicate substrate such as ceramics or glass; permanently transferring the pattern to the surface of ceramic or glass substrate after the peelable coating is peeled.

The protective coating film formed by the resin component of the prevent invention has excellent water resistance, strong mechanical resistant performance, and satisfactory peeling performance. The peelable coating provided by the prevent invention has excellent peeling performance even under the condition of prolonging storage period, meanwhile, the peelable coating does not have the defects of similar components having been disclosed so far, thereby having good application prospect.

DETAILED DESCRIPTION OF THE INVENTION

Embodiment 1

Preparation of clear solution: The film-forming resin, polypropylene glycol, a part of glycerin fatty acid ester and additive mentioned below are dissolved in a single solvent or mixed solvent (see Table I), then heated to 60 degrees Celsius and kept, stirred for two hours.

TABLE I

| Peelable cover oil | |
|---|---|
| Shellsol A[1] | 55.3 (part by weight) |
| PPG 10.000[2] | 4.5 |
| Fatty acid ester of glycerine[3] | 0.5 |
| DEGALAN P 24[4] | 39.0 |
| BYK 065[5] | 0.7 |

Note:
[1]Solvent, SHELLSOL/SHELL, type A; boiling point: 165~185 degrees Celsius;
[2]Polyacrylic acid 10,000, plasticizer + separating agent, Zhejiang Huangma Chemical Industry Group Co., Ltd.;
[3]Glycerin fatty acid ester, Loxiol G 10, Shenzhen Kening Chemical Industry Co., Ltd.;
[4]Polyacrylic acid resin, Degalan P 24, EVONIK;
[5]Defoamer, ALTANA CHEMIE.

The above coating solutions are coated on the organic pigment layers of paper carriers by the screen printing method for one hour. Then, a peeling experiment is performed on the formed coating film to check its peeling performance. After decal is affixed to the surface of glass, the water in the color layer must be completely squeezed. Finally, the peelable cover glue can be peeled successfully. The result clearly shows that the components of the peelable coating of the embodiment are used with film-forming resin separating agent (used for accelerating the separation of film) and specific suitable solvent, which, according to the formula ratio, can be used for preparing a surface protective coating having excellent peeling performance.

Embodiment 2

Preparation of clear solution: The film-forming resin, polypropylene glycol, a part of glycerin fatty acid ester and additive mentioned below are dissolved in a single solvent or mixed solvent (see Table II), then, heated to 60 degrees Celsius and kept, stirred for two hours.

TABLE II

| Peelable cover oil | |
|---|---|
| Shellsol A[1] | 55.3 (part by weight) |
| PPG 10.000[2] | 3.0 |
| Fatty acid ester of glycerine[3] | 2.0 |
| DEGALAN P 24[4] | 39.0 |
| BYK 065[5] | 0.7 |

Note:
[1]Solvent, SHELLSOL/SHELL, type A; boiling point: 165~185 degrees Celsius;
[2]Polyacrylic acid 20,000, plasticizer + separating agent, Zhejiang Huangma Chemical Industry Group Co., Ltd.;
[3]Glycerin fatty acid ester, Loxiol G 10, Shenzhen Kening Chemical Industry Co., Ltd.;
[4]Polyacrylic acid resin, Degalan P 24, EVONIK;
[5]Defoamer, ALTANA CHEMIE.

The above coating solutions are coated on the organic pigment layers of paper carriers by the screen printing method for one hour. Then, a peeling experiment is performed on the formed coating film to check its peeling performance. After decal is affixed to the surface of glass, the water in the color layer must be completely squeezed. Finally, the peelable cover glue can be peeled successfully. The result clearly shows that the components of the peelable coating of the embodiment are used with film-forming resin separating agent (used for accelerating the separation of film) and specific suitable solvent, which, according to the formula ratio, can be used for preparing a surface protective coating having excellent peeling performance.

The above is the detailed description made to the present invention in conjunction with specific preferred embodiments, but it should not be considered that the specific embodiments of the present invention are only limited to the these descriptions. For one of ordinary skill in the art to which the present invention belongs, many deductions and replacements can be made without departing from the inventive concept. Such deductions and replacements should fall within the scope of protection of the invention.

What is claimed is:

1. A resin composition used for peelable coating, including the following components in part by weight:
   (a) film-forming resin containing at least one acrylic resin, defined to be 100 parts;
   (b) at least one separating agent, which is polypropylene glycol or glycerin fatty acid ester or their mixtures, defined to be 0.1-40 parts based on component (a); and
   (c) at least one solvent, defined to be 40-60 parts based on component (a),
   wherein the acrylic resin of the component (a) is butyl methacrylate-methyl methacrylate copolymer with the average molecular weight of 150.000~180.000.

2. The resin composition used for peelable coating according to claim 1, further including the following component in part by weight:
   (d) at least one additive, defined to be 0.1-2 parts based on component (a).

3. The resin composition used for peelable coating according to claim 2, wherein:
   the solvent of the component (c) is one or more mixtures of propanol, butanol, diacetone alcohol, aromatic hydrocarbon, and glycol ether; and
   the additive of the component (d) is one or more mixtures of plasticizer, pigment, defoamer, and thixotropic agent.

4. The resin composition used for peelable coating according to claim 3, wherein:

the aromatic hydrocarbon of the component (c) is trimethylbenzene and derivative thereof; and the plasticizer of the component (d) is phthalate ester.

5. The resin composition used for peelable coating according to claim 1, wherein:

the component (b) is polypropylene glycol with the molecular weight of 8000~20.000, and glycerin fatty acid ester with the acidity of 0-1 mg KOH/g and the saponification value of 151-170 mg KOH/g.

6. The resin composition used for peelable coating according to claim 5, wherein:

the component (b) is defined to be 1-30 parts based on component (a).

7. A process for compounding resin composition used for peelable coating, including the following steps:

(A) weighing the components (a), (b), (c) and (d) of the resin composition used for peelable coating according to any one of claims 2-4, uniformly mixing the components at room temperature; and (B) heating the mixture for 30-60 min at a temperature of 50-70 degrees Celsius.

* * * * *